Dec. 4, 1951     E. F. SMALL     2,577,371
METHOD OF PREPARING OUTSOLES
Filed May 20, 1950     2 SHEETS—SHEET 1
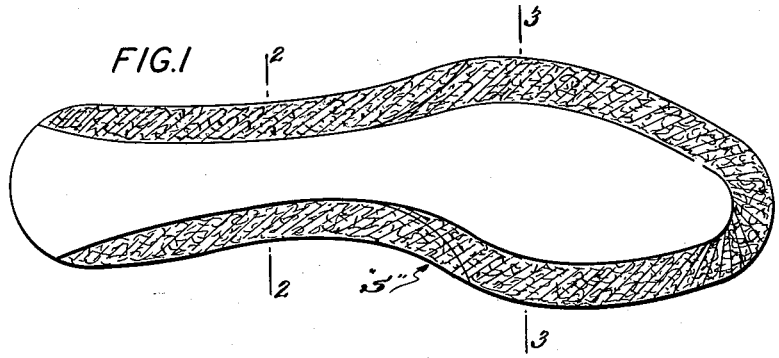
FIG.1
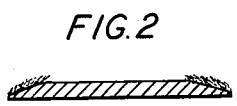     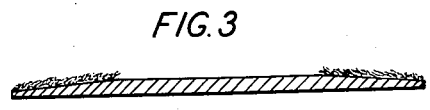
FIG.2     FIG.3
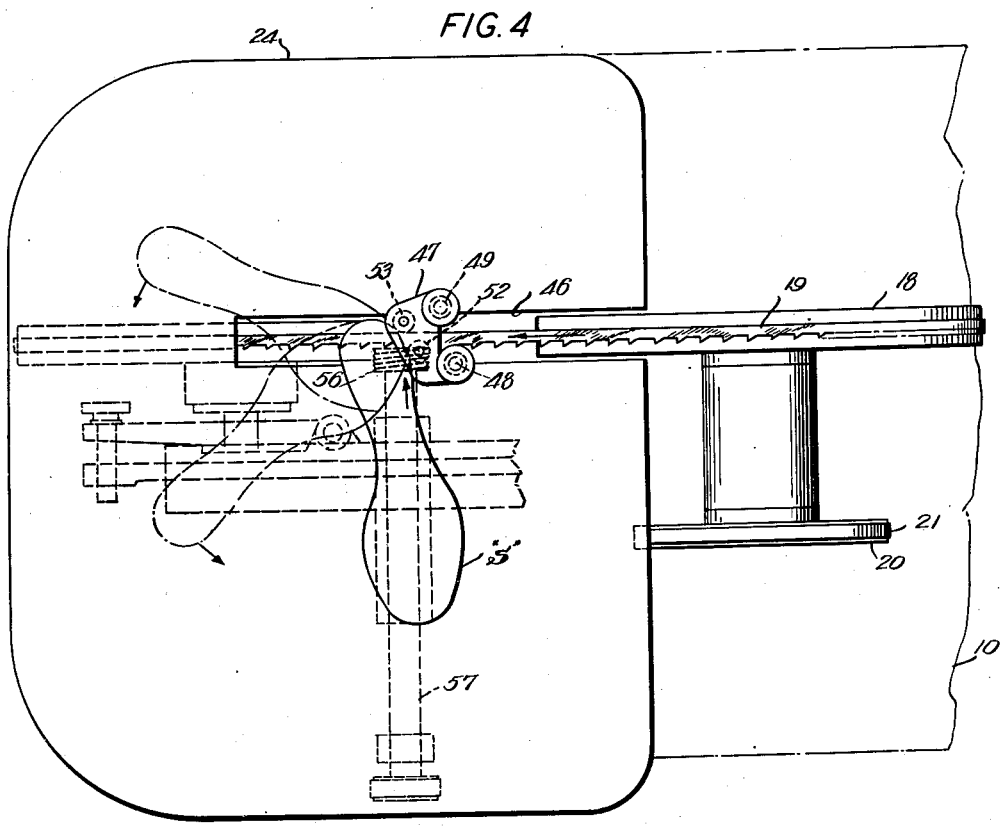
FIG.4
Inventor
Edward F. Small
by John F. Smith
Attorney Dec. 4, 1951  E. F. SMALL  2,577,371
METHOD OF PREPARING OUTSOLES Filed May 20, 1950  2 SHEETS—SHEET 2

Inventor
Edward F. Small
by John L. Smith
Attorney

Patented Dec. 4, 1951

2,577,371

UNITED STATES PATENT OFFICE 2,577,371

METHOD OF PREPARING OUTSOLES

Edward F. Small, Newton, Mass., assignor to Compo Shoe Machinery Corporation, Boston, Mass., a corporation of Delaware Application May 20, 1950, Serial No. 163,280

8 Claims. (Cl. 12—146)

This invention relates to methods of fitting outsoles preparatory to their attachment to shoes.

More particularly the invention relates to a method of shank reducing, forepart reducing, and roughing of the marginal portions of outsoles whereby such operations are performed progressively with a single cutting tool in a manner which provides uniform results with increased production.

In preparing outsoles, intended for cement attachment to shoes, it is usual practice to reduce a marginal area of the attaching face of the outsole to provide at the shank portion a bevel of a rather steep angle so as to leave a thin sole edge which will hug close to the upper of a shoe to which the sole is attached, and to provide around the forepart of the sole a bevel of lesser angle so as to leave a substantial sole edge thickness.

These reducing operations are generally performed by manually guiding the sole while feeding it past a stationary knife. Thus, at least three operations must be performed; i. e., a cut is made at the inside shank portion, a cut is made at the outside shank portion, and a cut is made around the entire forepart portion. Afterwards, as another separate operation, the entire reduced or skived area is roughened to provide a receptive surface for the sole attaching cement.

Heretofore, it has been proposed to perform the shank reducing, the forepart reducing, and the roughing operation progressively with the aid of a series of tools such as rotating cutters. However, since such series of tools must be controlled by patterns or cams the mechanism is costly and changes in sizes and styles of soles presents difficult problems.

Another method of reducing the shank and forepart portions of soles, which has been used to some extent, is to deform the sole by passing it through matrix rolls and while the sole is deformed to cut it with a stationary knife. This method is also costly since numerous matrix shapes are required to properly treat all sizes of soles and if the sole shape is altered to any extent new matrices are necessary.

Although the above described methods of preparing soles can be performed by power operated machines, due to the cost of such machines and the patterns or matrices required, most soles are still prepared by the old separate operation method.

An object of this invention is to provide a method of progressively shank reducing and forepart reducing outsoles whereby only a single cutting tool is required to treat all sizes and shapes of soles.

Another object of the invention is to provide a method of progressively and simultaneously reducing and roughing the marginal area of the attaching face of outsoles with a single cutting tool.

A still further object of the invention is to provide a method of progressively reducing and simultaneously roughing the marginal portion of outsoles whereby results are uniform, production is increased, and tool costs are reduced.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

For a fuller understanding of the nature and objects of the invention reference should be had to the following detailed description taken in connection with the accompanying drawing, in which:

Fig. 1 is a plan view of an outsole which has been prepared by my method;

Fig. 2 is a transverse cross sectional view taken along lines 2—2 of Fig. 1;

Fig. 3 is a transverse cross sectional view taken along lines 3—3 of Fig. 1;

Fig. 4 is a partial plan view of form of apparatus which may be used to practice the method of my invention;

Figure 5:
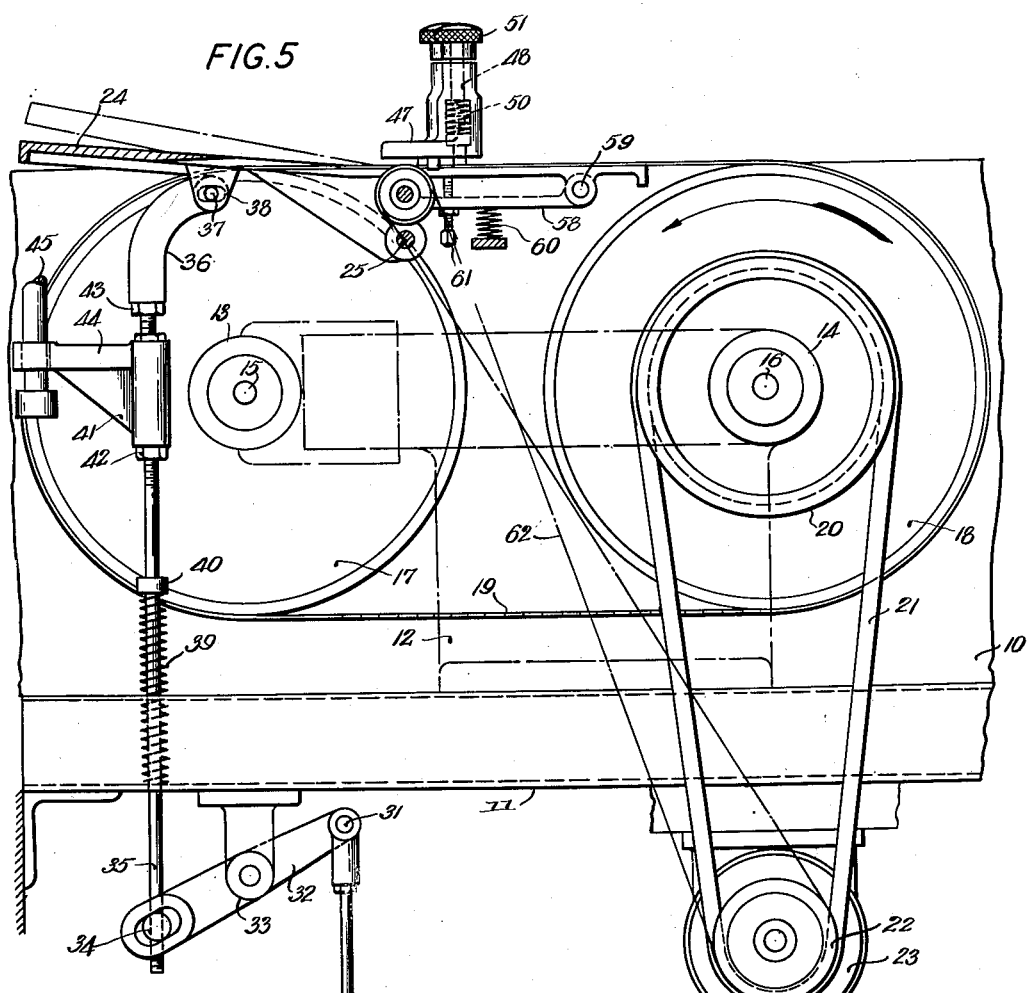
Fig. 5 is a partial side elevation, partly in section, of the apparatus shown in Fig. 4.
Figure 6:
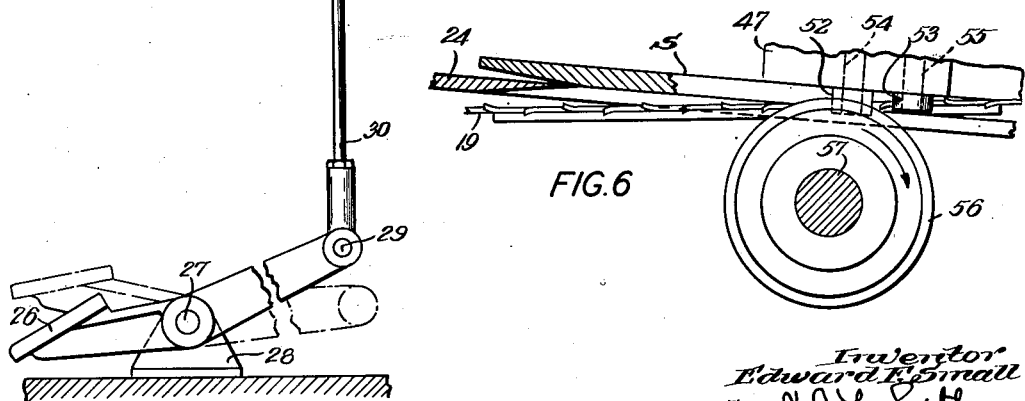
Fig. 6 is a fragmentary view showing, on an enlarged scale, a sole being treated according to my method by the apparatus of Figs. 4 and 5.

Referring to the drawings, particularly to Figs. 4, 5 and 6, there is shown one suitable form of apparatus useful for carrying out my improved method of preparing outsoles. Such form of apparatus comprises a frame casting generally designated 10 to which is secured a supporting beam 11 on which is mounted a bracket 12, shown in dot-dash lines, having spaced bearings 13 and 14 in which are journalled the shafts 15 and 16 carrying the drums 17 and 18.

A flexible endless cutting blade 19, shown in the form of a skip-tooth band saw, is arranged to run on the drums and shaft 16 is adapted to be driven by the sheave 20 which is connected by the belt 21 to the sheave 22 on the electric motor 23.

Preferably, as hereinafter explained, the drum 18 is driven in the direction of the arrow as shown in Fig. 5. Also, since the drums 17 and 18 are spaced from each other the blade 19 will have a portion between the drums which will form a straight line which will be hereinafter referred to as the path of the blade.

The sole supporting table 24 is pivoted at 25 to a boss formed on the frame 10 and is adapted to be swung about its pivot to vary the angle of the plane of the table with respect to the path of the cutting blade 19. This may be accomplished by the treadle 26 which is pivoted at 27 to the stand 28 and at 29 to the rod 30. The upper end of the rod 30 is pivoted at 31 to one end of the lever 32 which is fulcrumed at its center to a bracket 33 held to the beam 11. The other end of the lever 32 is slotted to receive the pin 34 which is threaded to the lower end of the rod 35. The upper end of the rod is threaded to the curved arm 36 which is connected by the pin 37 to an ear 38 depending from the underside of the sole supporting table 24. One end of the spring 39, which surrounds the rod 35, stops against the beam 11 and the other end abuts a collar 40 held to the rod 35. This spring 39 serves to bias the sole supporting table 24 upwardly to a position of greatest angle with respect to the path of the cutting blade. The bracket 41, adjustably held to the rod 35 by nuts 42 and 43, is provided with an extension 44 which contacts a stop 45 held to the frame 10.

The sole supporting table 24 is provided with a slot 46 to clear the cutting blade 19.

To guide and hold a sole in relation to the cutting blade 19, the hold-down member 47 fits over the studs 48 and 49 which are threaded into the table and the bores in the hold-down are counterbored to receive the springs 50 which serve to bias the hold-down upwardly away from the table. The knurled adjusting nuts 51 are screw threaded to the studs so that the clearance between the hold-down and the table may be varied to accommodate various thicknesses of soles.

The sole edge guide rolls 52 and 53 fit over the pins 54 and 55 extending from the underside of the hold-down.

The feed screw 56 is secured to the shaft 57 which is journalled in a bracket 58 pivoted at 59 to the underside of the sole supporting table. The bracket 58 is biased upwardly by the spring 60 so that the feed screw is urged into contact with a sole placed upon the table and thus forces the sole into engagement with the sole contacting surface of the hold-down member 47. The adjustable stop screw 61 prevents the feed screw from contacting the cutting blade when there is not sole between it and the sole hold-down.

The feed screw, which is a left hand thread, is driven by the belt 62 in a clockwise direction as viewed in Figs. 5 and 6 so that the motion of the screw tends to advance the sole past the cutting blade and also to urge the sole into contact with the guide rolls 52 and 53.

As shown in Fig. 4, the sole edge guide rolls 52 and 53 are spaced apart and are located with the first contacted roll 52 rearward of the second contacted roll 53. This positioning of the guide rolls defines a line of feed which also tends to keep the sole in contact with the rolls at all times and allows the cutting blade to travel over the sole margin in a path which forms an oblique line to the edge of sole contacted by the guide rolls.

In preparing a sole in accordance with my improved method and with the form of apparatus described, a rounded or died-out sole blank S is provided and it is placed upon the sole supporting table 24 with its attaching face downward towards the table, the heel end of the sole is then entered under the hold-down 47 with the edge of the sole against the guide roll 52. The rotating feed screw 56 then bites into the attaching face of the sole and progressively feeds its marginal portion past the band saw blade 19, which, preferably, is running in a direction leading from the edge of the sole towards the center of the sole so that a clean outer edge is provided and all ragged or extended leather fibres will be left spaced inwardly of the treated margin. This cuts a bevel on the sole margin as determined by the setting of the sole supporting table. When the ball portion of the sole reaches the cutting blade the operator depresses the treadle 26 to lower the table 24 so that a bevel of lesser angle is cut around the forepart portion of the sole as shown by Fig. 3. Of course when the ball line is reached at the opposite side of the sole the operator releases the treadle so that the table is again urged upwardly by the spring 39 and the saw blade cuts the shank portion of the sole at the greater bevel as shown by the section of the sole in Fig. 2.

When using the band saw blade for reducing, roughing of the reduced area is simultaneous since the sharp saw teeth and the set of the teeth pull or comb up the leather fibres and produce a suitable surface for the reception of sole attaching cement.

Of course, if desired, roughing alone may be done if a previously reduced sole is presented to the machine. Likewise, reducing without roughing may be accomplished by replacing the band saw with a band knife.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patents is:

1. That method of reducing the marginal edge of the attaching face of an outsole which comprises presenting the face of a sole to the cutting action of a narrow cutting blade running in a path forming an oblique line to the outer edge of the sole, maintaining the face of the sole at an angle with respect to the path of said blade, and progressively feeding the sole past said blade to remove material from the sole.

2. That method of reducing the marginal edge of the attaching face of an outsole which comprises presenting the attaching face of the sole to the cutting action of a band saw blade with the face of the sole held at an angle to the path of said blade, and progressively feeding the sole past said blade to remove material from the sole.

3. That method of reducing the marginal edge of the attaching face of an outsole which comprises presenting the attaching face of a sole to the cutting action of a band saw blade having its cutting teeth running in a direction leading from the outer edge of the sole towards the center of the sole, maintaining the face of the sole at an angle to the path of said blade, and progressively feeding the sole past said blade to remove material from the sole.

4. That method of shanking out and reducing the forepart of the marginal portion of the attaching face of an outsole which comprises presenting the marginal portion of the face of the sole to the cutting action of a band saw blade with the face of the sole held at an angle to the path of said blade, and progressively feeding the sole past said blade from a point located near the heel end at one side of the sole to a point located near the heel end at the other side of the sole while varying the angle of the face of the sole with respect to the path of said blade.

5. That method of shanking out and reducing the forepart of the marginal portion of the attaching face of an outsole which comprises presenting the marginal portion of the face of the sole to the cutting action of a band saw blade having its cutting teeth running in a direction leading from the outer edge of the sole towards the center of the sole and with the face of the sole held at an angle to the path of said blade, and progressively feeding the sole past said blade from a point located near the heel end at one side of the sole to a point located near the heel end at the other side of the sole while varying the angle of the face of the sole with respect to the path of said blade.

6. That method of roughing shoes soles to prepare them for the reception of cement to secure them to shoes which comprises presenting the attaching face of a sole to the cutting and tearing action of a a band saw blade and progressively feeding the sole past said blade to remove material from the sole.

7. That method of roughing shoes soles to prepare them for the reception of cement to secure them to shoes which comprises presenting the attaching face of a sole to the combined cutting and tearing action of a band saw blade with the face of the sole at an angle to the path of said blade, and progressively feeding the sole past said blade to remove material from the sole.

8. That method of treating shoe soles which comprises presenting the marginal edge of the attaching face of the sole to the combined cutting and tearing action of a band saw blade with the face of the sole held at an angle with respect to the path of said blade, and continuously feeding the sole past said blade from the heel end at one side of the sole to heel end at the other side of the sole while varying the angle of the sole with respect to said blade to progressively shank out, reduce the forepart and simultaneously roughen the marginal edge of the face of the sole.

EDWARD F. SMALL.

No references cited.